July 13, 1965     T. M. BONDHUS     3,194,709

AUTOMATIC FILM MOUNTING APPARATUS

Filed May 12, 1961                   9 Sheets-Sheet 1

INVENTOR
Tom M. Bondhus
BY
ATTORNEY

July 13, 1965 T. M. BONDHUS 3,194,709
AUTOMATIC FILM MOUNTING APPARATUS
Filed May 12, 1961 9 Sheets-Sheet 2

INVENTOR
Tom M. Bondhus
BY Robert M. Dunning
ATTORNEY

July 13, 1965 T. M. BONDHUS 3,194,709
AUTOMATIC FILM MOUNTING APPARATUS
Filed May 12, 1961 9 Sheets-Sheet 3

INVENTOR
Tom M. Bondhus
BY
ATTORNEY

INVENTOR
Tom M. Bondhus

July 13, 1965  T. M. BONDHUS  3,194,709
AUTOMATIC FILM MOUNTING APPARATUS
Filed May 12, 1961  9 Sheets-Sheet 5

INVENTOR
Tom M. Bondhus
BY Robert M. Dunning
ATTORNEY

July 13, 1965 T. M. BONDHUS 3,194,709
AUTOMATIC FILM MOUNTING APPARATUS
Filed May 12, 1961 9 Sheets-Sheet 6

INVENTOR
Tom M. Bondhus
BY Robert M. Dunning
ATTORNEY

July 13, 1965   T. M. BONDHUS   3,194,709
AUTOMATIC FILM MOUNTING APPARATUS
Filed May 12, 1961   9 Sheets-Sheet 7

INVENTOR
Tom M. Bondhus
BY Robert M. Dunning
ATTORNEY

July 13, 1965 T. M. BONDHUS 3,194,709
AUTOMATIC FILM MOUNTING APPARATUS
Filed May 12, 1961 9 Sheets-Sheet 8

INVENTOR
Tom M. Bondhus
BY
ATTORNEY

July 13, 1965 T. M. BONDHUS 3,194,709
AUTOMATIC FILM MOUNTING APPARATUS
Filed May 12, 1961 9 Sheets-Sheet 9

INVENTOR
Tom M. Bondhus
BY Robert M. Dunning
ATTORNEY 3,194,709
AUTOMATIC FILM MOUNTING APPARATUS
Tom M. Bondhus, Big Lake, Minn.
Filed May 12, 1961, Ser. No. 109,735
15 Claims. (Cl. 156—355)

This invention relates to an improvement in automatic film mounting apparatus and deals particularly with a device for mounting transparencies in slide folders.

Colored film such as the type used in 35 millimeter cameras is usually mounted in paper folders by the processing company after the film has been developed. These folders usually comprise a pair of hingedly connected paperboard panels having apertures therethrough which act as a supporting frame for the film. The panels are usually coated with a heat sealable film so that the two panels may be sealed to enclose the transparency by means of heat and pressure.

The film is normally supplied in strips containing a series of spaced pictures. Before mounting, the film must be cut to separate the pictures, and the individual pictures are then mounted in the folders. Due to the fact that in many instanuces the films cannot be replaced, extreme accuracy is necessary, particularly in the cutting of the film, in order to prevent the cutting of a picture in two. As a result, an apparatus for automatically mounting such transparencies must be extremely accurate and fool proof, in order to avoid costly mistakes.

An object of the present invention resides in the provision of an apparatus for receiving transparencies in strip form, cutting the film strip into sections slightly longer than the picture itself, placing each picture on the inner surface of a paperboard folder, closing the folder and sealing the folder in closed position automatically. Safety means are provided for preventing the operation of the apparatus in the event the various parts are not in proper relation.

A feature of the present invention resides in feeding the film through a transparent film support having gauge means for properly locating the film and through which the operator may see the exposed film to make sure that the film is in proper registry.

A feature of the present invention resides in a device of a type described including a pair of shearing jaws between which the film is fed and which act to support the film after it is cut from the remainder of the strip. The jaws swing down into position over one side of the duplex folder to desposit the picture in the proper location within the folder. Means is provided for holding the picture in proper location after it has been deposited. Means is provided for folding the folder from its flat form into folded form, and for clamping the folder closed under heat and pressure. The completed folder is then ejected and a new folder delivered into position.

A feature of the present invention resides in feeding the folders in two stages over a heating plate which preheat the folder sufficiently to soften the adhesive coated surfaces of the folder so that the two surfaces will adhere firmly together when pressure is applied thereto.

A further feature of the present invention resides in the provision of a means of adjusting the length of cycle of the operation while maintaining the proper speed of operation during the cycle. The time delay mechanism comprises a simple device for engaging and disengaging the operating clutch at desired intervals.

These and other objects and novel features of the present invention will be more clearly and fully set forth in the following specification and claims.

In the drawings forming a part of the specification.

The automatic film mounting device A is extremely compact in form, and as a result, a great number of parts are confined in a small area. Accordingly, in some of the views only those parts which are essential to a portion of the device are shown and other parts have been omitted. Furthermore, in view of the fact that the parts are all closely inter-related, some difficulty has been experienced in arranging the description of the figures so that all parts of the same units are consecutively shown.

*Drive mechanism*

Figure 1:
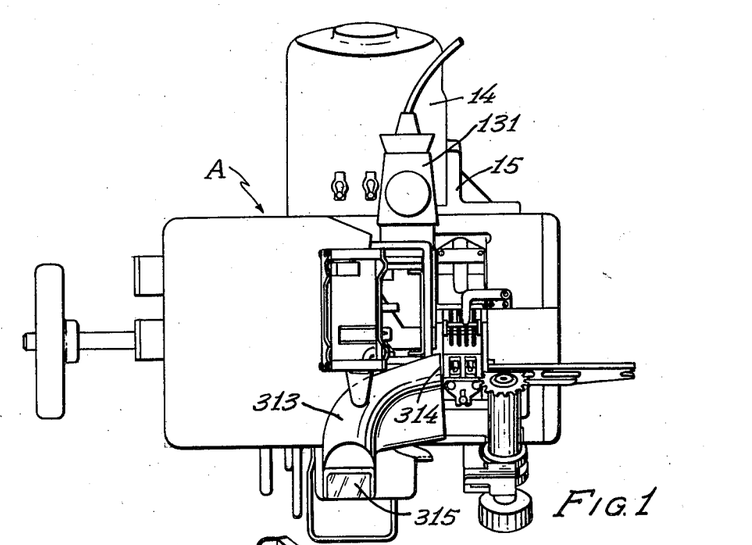
FIGURE 1 is a top plan view of the apparatus in readiness for use.
Figure 2:
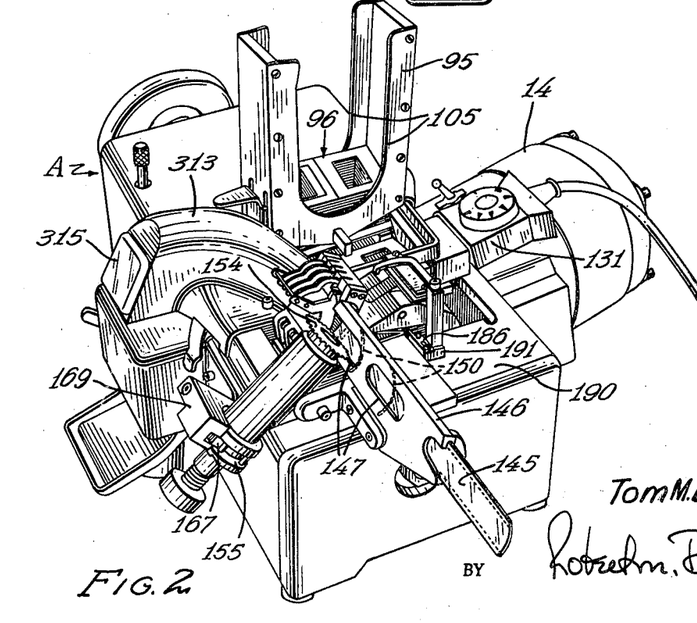
FIGURE 2 is a front perspective view of the apparatus.
Figure 12:
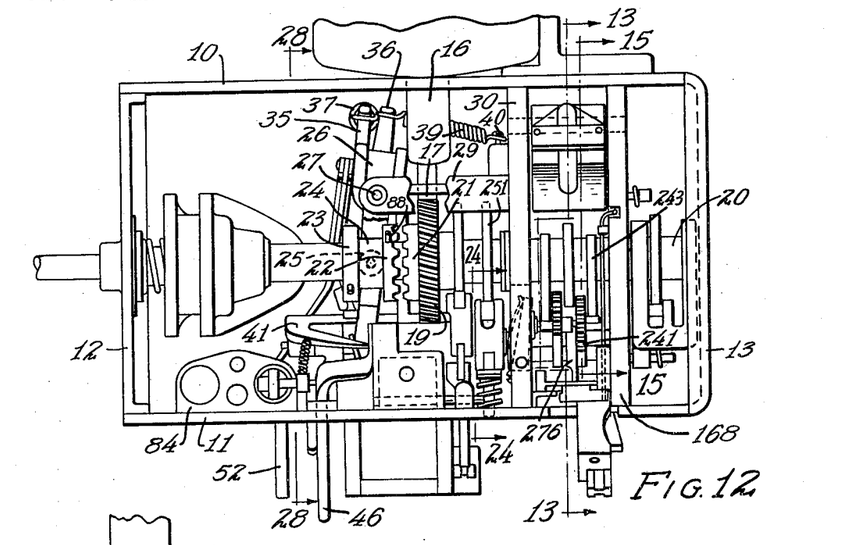
FIGURE 12 is a plan view of the apparatus with the upper part of the mechanism removed in order to show the general arrangement of parts.
Figures 28, 29, 30:
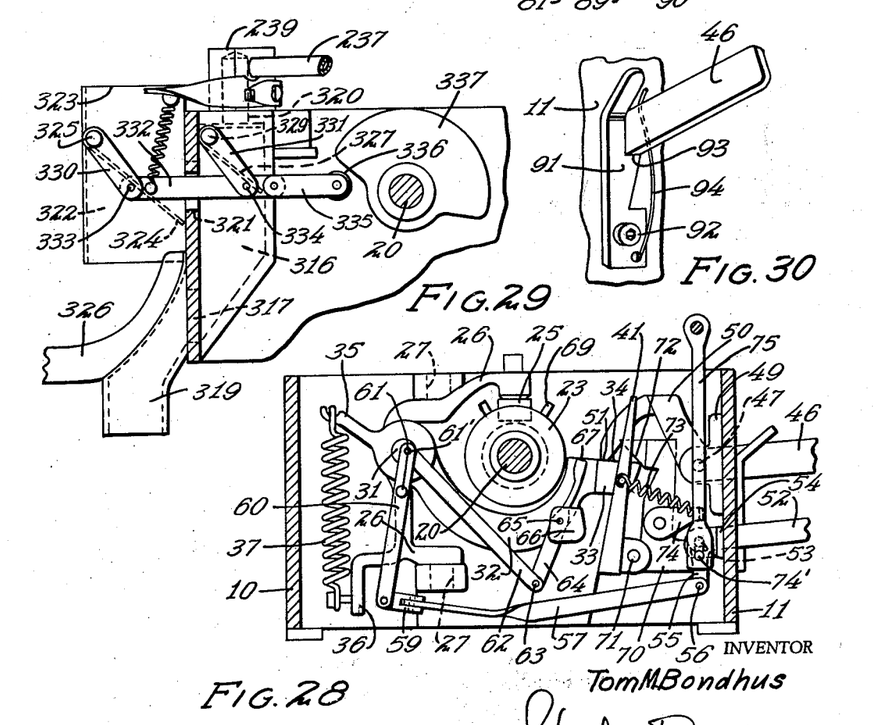
FIGURE 28 is a transverse section through the apparatus substantially on the line 28—28 of FIGURE 12.
FIGURE 29 is a diagrammatic view through a portion of the apparatus showing the manner in which the waste film is ejected.
FIGURE 30 is a perspective view of a portion of the front wall of the apparatus showing the clutch releasing lever.

As indicated in FIGURES 1, 2 and 12 of the drawings, the drive mechanism of the apparatus is mainly located within a generally rectangular box-like housing having a rear panel 10, a front panel 11, and parallel end panels 12 and 13. A motor 14 is mounted through the use of a suitable bracket 15 on the rear panel 10, and includes a motor shaft 16 which extends through the rear wall 10 and inclines forwardly and downwardly, supporting a worm gear 17 which is in mesh with a worm wheel 19 mounted upon a shaft 20. The worm wheel 19 is free to rotate about the shaft 20 and includes a toothed clutch disc 21 which may mesh with a cooperable toothed disc 22 on a clutch sleeve 23 keyed to the shaft 20. The clutch sleeve 23 is axially slidable along the shaft 20 and is provided with a peripheral groove 24 which is designed to accommodate a roller 25 supported by one end of a shift yoke 26. The clutch yoke 26 is pivotally supported by aligned pivots 27 by a U-shaped bracket 29 mounted on a transverse partition 30 extending between the rear and front walls 10 and 11. The shifting yoke arm 26 is shown in FIGURE 28 as being pivotally connected at 31 to an operating arm 32 which arcs down under the clutch sleeve 23 and terminates in a forwardly extending projection 33 having a substantially flat upper surface 34. An arm 35 projects rearwardly from the arm 32, and an opposed arm 36 extends rearwardly and downwardly from a portion of the shifting yoke 26. A spring 37 connects the ends of the arms 35 and 36, tending to swing the forward end 33 of the arm 32 upwardly or in a counterclockwise direction about its pivot 31. As indicated in FIGURE 12 of the drawings, a spring 39 connects the arm 36 to a fixed lug 40 on the partition 30 thus tending to swing the shifting yoke 26 in a clockwise direction as viewed in FIGURE 12, thus urging the clutch sleeve 23 into clutch disengaging position.

Figures 6, 7, 8:
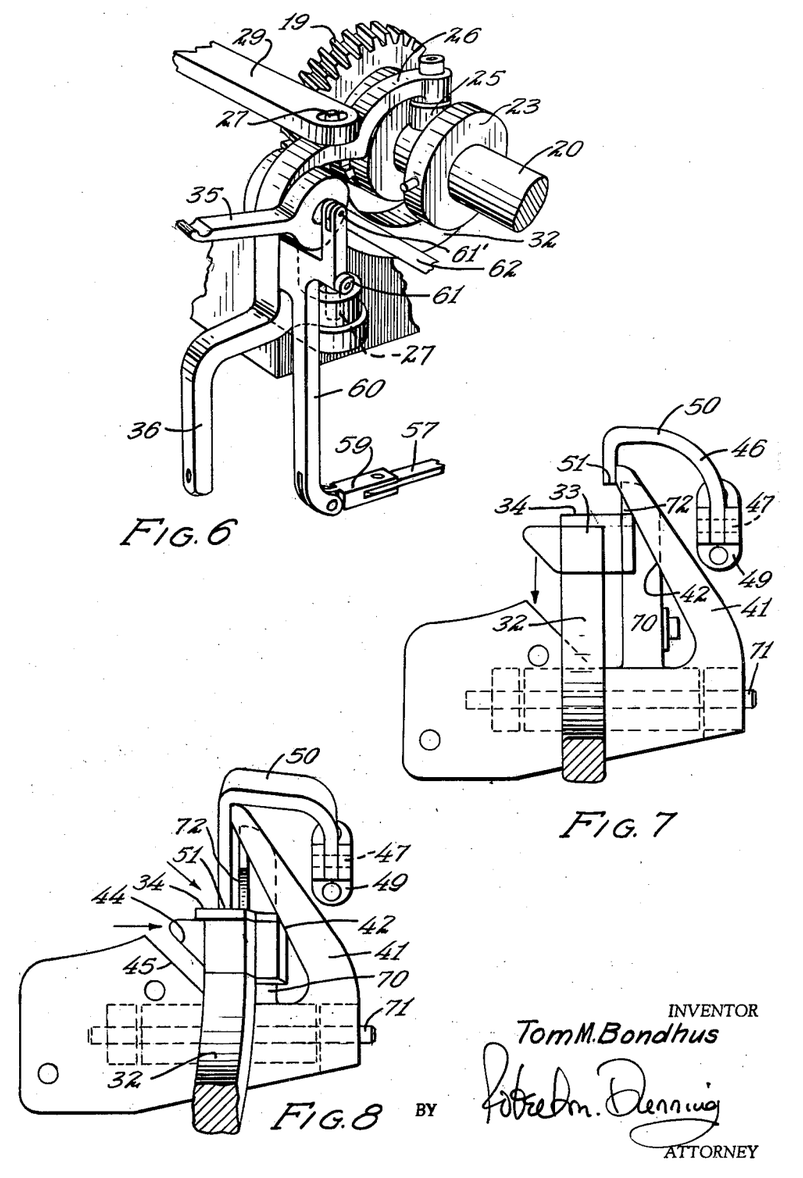
FIGURE 6 is a diagrammatic perspective view of a portion of the clutch employed to engage and disengage the drive motor.
FIGURE 7 is a sectional detail of a portion of the clutch operating mechanism, in the engaged position of the clutch.
FIGURE 8 is a view similar to FIGURE 7 showing the clutch in disengaged position.

With reference now to FIGURES 7 and 8 of the drawings, and also to FIGURE 12 thereof, a hook shaped cam 41 is designed to engage the projecting end 33 of the arm 32, this cam being guided upwardly and laterally from a position in which the clutch is disengaged to the position (FIGURE 7) in which the clutch is engaged. The spring 37 tends to urge the projecting end 33 of the lever arm 32 upwardly against the inclined surface 42 of the cam 41, thus swinging the arm 32 and the shifting yoke 26 to which the arm 32 is attached into clutch engaging position. Downward movement of the lever arm 32 causes the clutch yoke to disengage the clutch due to the fact that the spring 39 tends to swing the arm 32 in a manner to disengage the clutch when it is not engaged with the surface 42 of the cam. Furthermore, the projection 33 is provided with an inclined under surface 44 which is engageable with a cam surface 45 in opposed relation to the surface 42 so that if the arm 32 is lowered vertically, the engagement of the surfaces 44 and 45 will shift the lever arm 32 to the right far enough to disengage the clutch.

As indicated in FIGURE 28 of the drawings, a manually operable lever 46 extends through the front wall 11 of the housing and is pivotally connected at 47 to a bracket 49 mounted on the inner surface of the front wall. The lever 46 is provided with an arched end portion 50 which terminates in a bearing edge 51 which is engageable against the flat upper surface 34 of the projection 33 of the lever 32. When it is desired to disengage the clutch at any point in the cycle of operation, the forwardly projecting end of the lever 46 is raised, swinging the bearing end 51 downwardly against the upper surface of the projection 33 and acting to lower this end of the arm 32. When this is done, the cam surfaces 44 and 45 engage to move the lever arm laterally to disengage the clutch, as previously described. This action is assisted by the action on the spring 39.

An additional means is provided for stopping the apparatus at the end of any cycle of operation. This means comprises a bell crank lever 52 which is shown in FIGURE 28. The lever 52 is pivotally supported at 53 to a bracket 54 mounted on the front panel 11. The lever 52 is a bell crank lever and includes a downwardly extending arm 55 which is pivotally connected at 56 to a link 57. The link 57 is connected through a universal joint 59 to the lower end of a lever 60 which is pivotally connected at 61' to a portion of the clutch shifting yoke 26. The upper end of the lever 60 is pivotally connected at 61' to a link 62, the other end of which is pivotally connected at 63 to a lever 64 which is pivotally connected at 65 to a bracket 66 attached to the arm 32. The upper end 67 of the lever 64 is in the path of movement of a radially extending pin 69 on the clutch sleeve 23.

When the lever 52 is lowered by a downward force exerted against a portion of the lever 52 projecting through the front wall 11, the lever 52 is pivoted about the pivot 53 in a clockwise direction, acting through the link 57 to swing the lever 60 in a clockwise direction. This action swings the lever 64 in a counter clockwise direction in the path of movement of the projecting pin or lug 69 on the clutch sleeve 23.

The rotation of the clutch sleeve 23 acts to urge the lever 64 downwardly. This action causes the lever pivot 65 to also be moved downwardly, and as the pivot 65 is connected to the arm 32, the arm 32 is likewise swung downwardly. As has been described in conjunction with the description of FIGURES 7 and 8 of the drawings, downward movement of the lever 32 acts to disengage the clutch and to permit free rotation of the drive shaft relative to the remainder of the apparatus.

A bell crank 70 is supported upon a fixed pivot 71 connected to bosses on the front side of cam 41 and includes a cam shaped projection 72 at its upper end which also extends over the flat surface 34 of the projection 33 of the lever arm 32. The lever 70 is urged in a counter clockwise direction by a spring 73 which extends between a bracket arm 74 on the lever 70 and a fixed part of the cam 41.

Figures 27, 31:
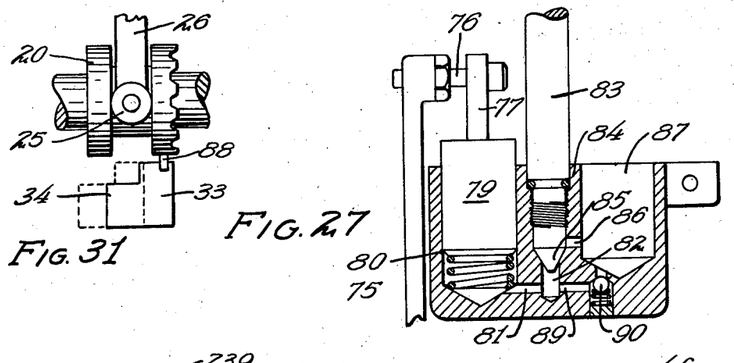
FIGURE 27 is a sectional view through the cycle timer.
FIGURE 31 is a diagrammatic detail view of a part of the clutch mechanism.

The bell crank lever 70 is pivotally and slidably connected at 74" to an upwardly extending link 75. With reference now to figure 27 of the drawings, the upper end of the link 75 is connected by a connecting bolt 76 to the upper end portion 77 of a plunger 79 slidable in a cylinder 80. The lower end of the cylinder 80 is connected by a passage 81 to a chamber 82. A needle valve 83 is threaded into the housing 84 containing the cylinder 80 and includes a tapered end 85 which more or less seats against the upper end of the chamber 82. Fluid may flow from a passage 86 controlled by the valve 83 by a reservoir 87 also in the casing 84. The casing 84 is attached to the rear surface of the wall 11 by suitable means, and the location of the housing 84 is indicated in FIGURE 12 of the drawings.

The lower end of the cylinder 80 is also connected to the reservoir 87 by a bypass 89 including a check valve 90. Accordingly, when the piston 79 moves upwardly in the cylinder 80, fluid is quickly drawn from the reservoir into the lower end of the cylinder 80 beneath the piston 79. However, downward movement of the piston 79 must force the fluid past the needle valve 83 and back to the reservoir, thus slowing down the speed of operation. The cam end 72 of the lever 70 is positioned to engage a corner of the upper edge 34 of the lever 32 when this lever is in lowered position and acts to delay the raising of the lever to an extent determined by the position of the needle valve 83. In other words, a variable time is provided between cycles due to the fact that each time the arm 32 is lowered into clutch disengaging position, the cam end 72 of the lever 70 engages over the end of the lever 32 so that upward pivotal movement of the arm 32 is delayed to the extent of time required for the fluid in the lower end of the cylinder 80 to flow past the needle valve 83 and into the reservoir 87. As a result, the bell crank lever 70 swings slowly in a clockwise direction until the piston 79 lowers sufficiently to disengage the cam surface 72 from the end of the arm 32. Due to the fact that the cam end 72 moves out of registry with the projecting end 33 of the lever 72 in the elevated position of the lever 32, the lowering of the end of the lever 32 may merely cause the end 33 to move downwardly until it clears the cam face 72.

During each cycle of operation of the drive shaft 20, a pin 88 on the shift collar 23 strikes the upper flat surface 34 of the projection 33 (see FIGURE 31), acting to swing the arm 32 downwardly. The cam surface 44 on the arm 32 strikes the relatively fixed cam surface 45 (FIGURE 8) to disengage the clutch 22 in the manner described. The cycle of operation is stopped at a point when the film folder to be later described is above the heating element to time the heating of the folder. As the arm swings downwardly by action of the pin 88, the projection 33 on the arm moves laterally toward the position shown in dotted lines in FIGURE 30. However, simultaneously with the downward movement of the projection 33, the bell crank lever 70 is pivoted partially over the surface 34 of the arm projection 33 by the spring 73, lifting the timer operating link 75 to reset the timer. Thus during each cycle of operation, the pin 88 disengages the clutch, and resets the timer causing a time delay which is variable according to the setting of the timer.

In summary, the clutch disc 22 may be disengaged from its cooperable clutch disc 21 in three different ways. In each case, the clutch arm is swung downwardly about its pivot 31. This causes the cam portion 44 of the arm end to engage the cam 45 to move the arm laterally, swinging the clutch operating arm 26 to disengage the clutch. This can be accomplished at any point of the cycle by the pivoting of the lever 46 to manually depress the arm end 33. Secondly the clutch can be disengaged by manual movement of the lever 52, which acts through the linkage described to swing the lever 64 in the path of movement of the pin 69. As the lever 64 is on the arm 32, the movement of the pin 69 pivots the arm 32 downwardly, disengaging the clutch. The pin 69 is positioned to stop the operation of the apparatus at a point at which the film feed may be rethreaded.

The third manner in which the clutch is disengaged involves the timing mechanism. Once during each cycle of operation, the pin 88 engages the arm end 33, disengaging the clutch and resetting the timing mechanism for a predetermined time delay before the clutch is again engaged. The purpose of this arrangement is to heat the adhesive on the folder to a proper temperature.

A latch 91 is shown in FIGURE 30 of the drawings for holding the manually operable clutch disengaging lever 46 in disengaged position. The latch 91 is pivotally connected at 92 to the front panel 11 and includes a shoulder 93 engageable beneath the lever 46 in the elevated position of the lever to hold the clutch disengaged. The shoulder 93 engages against the under surface of the lever 46, and is normally urged toward this position by a spring 94.

*Folder feeding apparatus*

In the operation of the device, the film folders are normally stored in superimposed relation in a hopper. The folders are first fed into a position overlying a heating plate which acts to heat the adhesive coating on the folders so that the sides of the folder may readily seal together. The folders are then fed into alignment with the film positioning or transferring mechanism at which point the picture is inserted and the folder is folded. The completed folder bearing the picture is then ejected from the apparatus.

Figure 3:
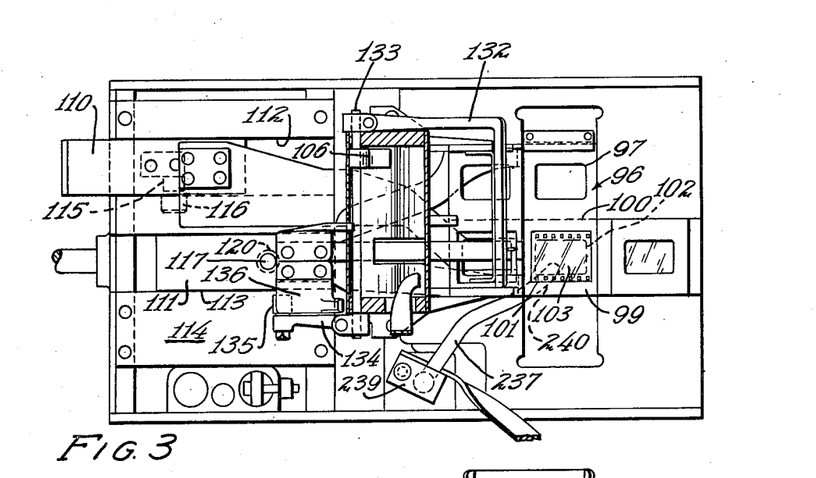
FIGURE 3 is a top plan view of the apparatus, portions thereof being broken away to better disclose the operation.
Figures 4, 5:
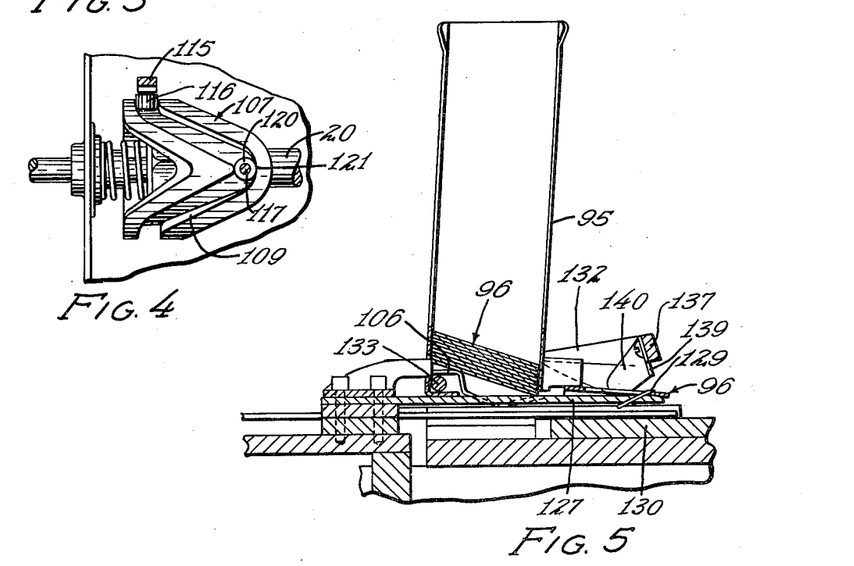
FIGURE 4 is a plan view of the cam which functions to operate the folder feed mechanism.
FIGURE 5 is a vertical sectional detail through the folder hopper.

With reference now to FIGURES 3, 4 and 5 of the drawings, the folder containing hopper is indicated at 95 and acts to support a series of superimposed folders 96. The folders 96, as indicated in FIGURE 3, comprise two similar apertured panels 97 and 99 connected along a central line of fold 100. The panel 99 supports a marginal rectangular frame 101 which is of larger internal diameter than the rectangular aperture 102 in the panel. This frame 101 is of proper size to receive the film transparency 103 and is approximately the same thickness as the film transparency so that the edges of the folder may seal together when the folder is folded along the fold line 100 and the panels 97 and 99 are adhered in face contact.

As indicated in FIGURE 2 of the drawings, the hopper 95 is provided with U-shaped notches 105 in its opposite sides to facilitate inserting the folders 96 in place. As indicated in FIGURE 5 of the drawings, when in place, the folders 96 are held in an inclined position by a support 106 in one corner of the hopper 95. The manner in which the folders are moved from one position to another will now be described.

The drive shaft 20 is provided near one end thereof with a cam 107 having a continuous peripheral cam track 109. A pair of slides 110 and 111 are slidably mounted in grooves 112 and 113 respectively in the top 114 of the housing. A bracket 115 extends downwardly from the under side of the slide 110 and supports a cam roller 116 on a horizontal plane through the axis of the drive shaft 20. A pivot 117 extends downwardly from the slide 111 and supports a second cam roller 120. As indicated in FIGURE 4 of the drawings, both of the rollers 116 and 120 move in the groove 109 of the cam 107.

The groove 109 of the cam 107 remains on a single plane normal to the axis throughout one-half of the circumference of the cam. The cam track extends diagonally in one direction throughout the next 90 degrees to the forward apex 121 of the cam and then extends diagonally in the opposite direction through the next 90 degrees of rotation. As a result, each slide 110 or 111 remains stationary in a retracted position through one-half of the cycle of operation of the apparatus, move forwardly for one-quarter revolution of the drive shaft and move rearwardly or into retracted position during the next quarter revolution of the drive shaft. Due to the fact that the cam roller 116 is positioned at 90 degrees from the cam roller 120, the slide 110 is first urged forwardly and 90 degrees later, the slide 111 is moved forwardly.

Figure 9:
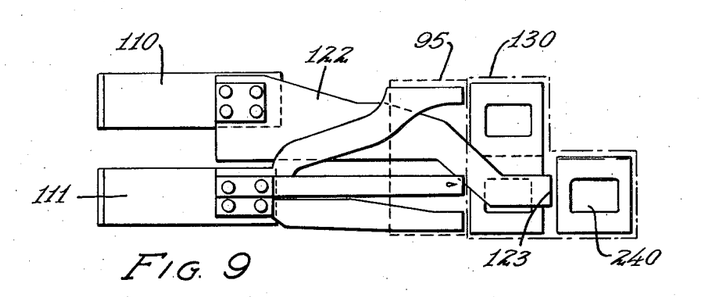
FIGURE 9 is a diagrammatic view showing the folder feed mechanism in retracted position.
Figure 10:
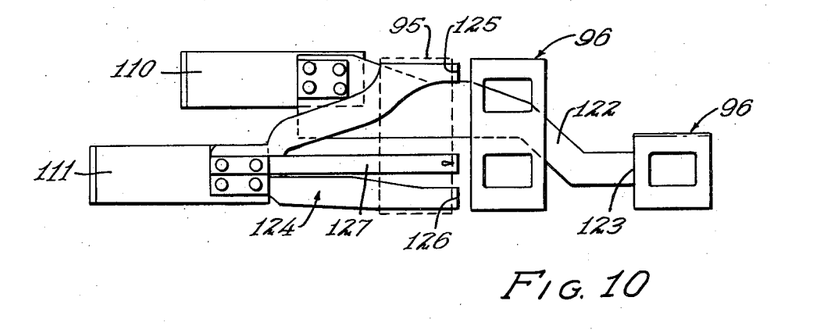
FIGURE 10 is a view similar to FIGURE 9 showing the ejector in folder rejecting position.
Figure 11:
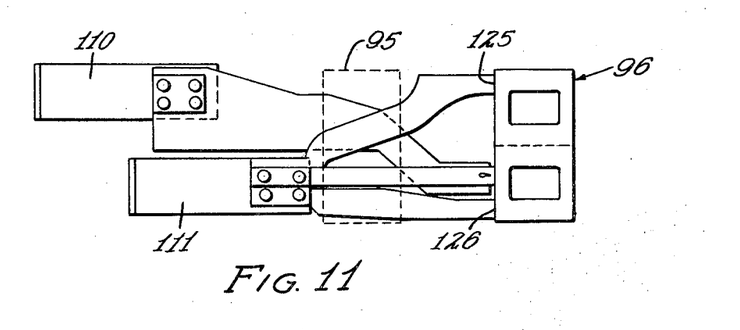
FIGURE 11 is a view similar to FIGURES 9 and 10 showing the ejector in retracted position and the folder advancing means in projected position.

With reference now to FIGURES 9, 10 and 11 of the drawings, it will be noted that the slide 110 is provided with a forwardly projecting ejector blade 122 having a square end 123 which is designed to engage the folded and sealed folder 96 and to eject this folder from the machine or at least laterally from sealing position. In FIGURE 9 of the drawing, both of the slides 110 and 111 are shown in retracted form. FIGURE 10 illustrates the slide 110 in projected position and the end 123 of the blade 122 has pushed the closed and sealed folder 96 from the position in which it was sealed to a position laterally thereof. At this point, the slide 110 starts to retract and the slide 111 starts to move forwardly.

The slide 11 supports a forked blade 124 having a pair of pusher arms 125 and 126 which are designed to engage the folder 96 when the folder is in preheating position and to move this folder laterally to closing and sealing position.

The arms 125 and 126 merely engage against the trailing edge of the folder 96 and push it laterally a predetermined distance. During this motion, the folder 96 overlies the thin ejector blade 122.

The slide 111 also supports a feeder arm 127 which is slightly above the level of the forked arms 125 and 126. As indicated in FIGURE 5 of the drawings, the forward end of the arm 127 is provided with one or more upwardly and forwardly inclined pins 129 which engage in one of the apertures 102 in the folder 96 and draw the lowermost folder 96 from the stack in the hopper into preheating position.

Thus it will be noted that the arm 127 engages the lowermost folder and moves to preheating position while simultaneously the arms 125 and 126 mounted upon the slide 111 move the previously preheated folder to sealing position. The feeding arm 127 and pusher arms 125 and 126 are then retracted into position to repeat the same operation.

The heating plate 130 is indicated in FIGURE 5 of the drawings and is of a generally L-shaped construction as indicated by the broken lines in FIGURE 9 of the drawings. The heating plate may contain suitable heating elements and in the particular arrangement illustrated is shown as heated by a built in heating element controlled by the detachable thermostatic control element 131 which is plugged into the heating element within the plate as indicated in FIGURES 1 and 2 of the drawings.

In order to hold the folder 96 in close proximity to the heating plate 130 and to insure the proper positioning of the folder for engagement by the pusher arms 125, 126, a U-shaped frame 132 (FIGURES 3 and 5) is supported on a pivot shaft 133 to overlie the folder 96 in preheating position. An arm 134 is mounted upon the shaft 133 and includes a cam roller 135 which extends in the path of movement of a bracket 136 mounted upon the slide 111. The bracket 136 projects laterally from the slide 111 above the level of the roller 135 and acts to swing the arm 134 bearing the roller 135 downwardly as the slide 111 moves into projected position. This action temporarily raises the U-shaped frame 132 to prevent interference with the forward movement of the folder 96 moving out of the hopper. This action also prevents the frame 132 from interfering with the pusher arms 125, 126.

As indicated in FIGURE 5 of the drawings the cross member 137 of the frame 132 supports a plate 139 having right angularly downwardly extending ears 140 near the end thereof which bear upon the folder 96 when it is in preheating position over the heat 130 and tend to hold the folder downwardly where it will be engaged by pusher arms 125, 126 during the next cycle of operation.

Film feed mechanism

Figure 20:
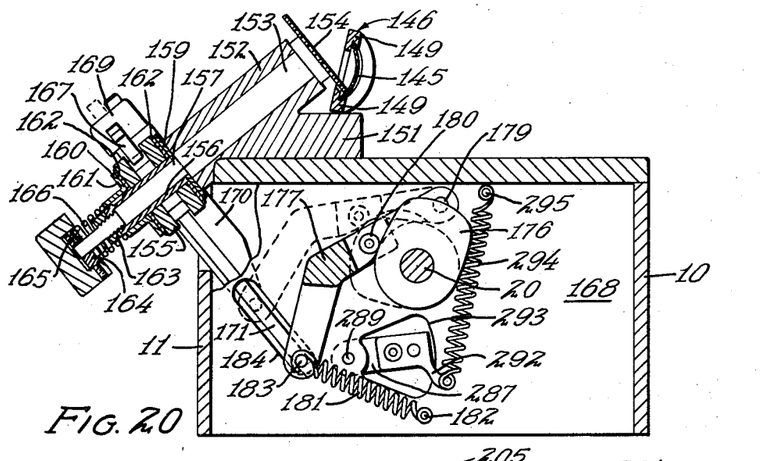
FIGURE 20 is a vertical sectional view through the film moving apparatus.

As indicated in FIGURE 2 of the drawings, the film strip 145 from which the transparencies 103 are cut enters an elongated transparent plastic slide 146 having elongated openings 147 therein for easier viewing and through which the pictures may be readily seen. The guide 146 is shown in FIGURE 20 as having rearwardly extending flanges along its top and bottom edges which are grooved in their opposed surfaces to accommodate the edge of the film strip 145. Indicating wires 150 (FIGURE 2) bridge the flanges 149 at proper intervals so that the location of the pictures in the guide may be determined at a glance. The grooves are somewhat closer together than the width of the film strip 145 so that the film strip is held in a bowed position as indicated for accurate handling. The bow of the film is contrary to the natural tendency of film to curl. A bracket 151 includes a bearing portion 152 supporting a shaft 153 at an angle to the housing with the axis of the shaft substantially parallel to the lower edge of the bowed film strip 145. A toothed sprocket 154 having 32 teeth is supported on the upper end of the shaft 153 and is arranged to intersect the path of the film strip so that the sprocket teeth may extend through the spaced perforations along the edge of the film strip. The provision of 32 teeth in the sprocket 154 is of importance, as one revolution of the sprocket advances the film the distance between pictures. A ratchet wheel 155 is rotatably supported upon a bearing 156 on a reduced diameter end portion 157 of the shaft 153. The end of the bearing 156 forces a disc 159 against the shoulder formed between the small and large diameter portions of the shaft 153. A sleeve 160 having a hub 161 is keyed to the bearing 156. Friction washers 162 are positioned between the bearing plates 159 and 160 and opposite sides of the ratchet wheel 155.

A nut 163 holds the bearing 156 in place. A collar 164 is secured to the end of the shaft 153 by a set screw 165 and a spring 166 is interposed between the collar 165 and the end of the hub 161.

This arrangement, in effect, forms a friction clutch between a ratchet wheel 155 and the shaft 153. A dog 167 is supported by a bracket 169 overlying the ratchet wheel to prevent rotation of this wheel in a reverse direction.

Figure 21:
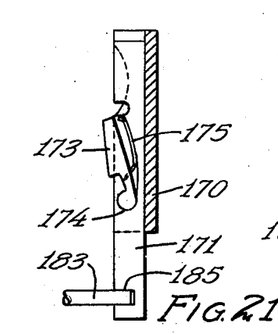
FIGURE 21 is a detail view of a portion of the apparatus illustrated in FIGURE 20.
Figure 22:
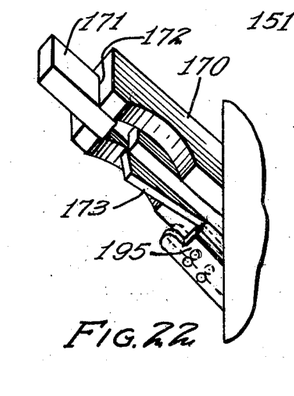
FIGURE 22 is a perspective view of the ratchet used for rotating the film drive mechanism.

A slide bracket 170 is supported on a partition wall 168 extending across the housing from the rear wall 10 to the front wall 11 and extends angularly through the front wall 11 in right angular relation to the axis of the shaft 153. The slide bracket 170 supports a ratchet arm 171 which extends longitudinally through a groove 172 in the slide support 170. As indicated in FIGURES 21 and 22 of the drawings, the ratchet arm 171 pivotally supports a ratchet dog 173, the end of which is supported in a cylindrical cavity 174 in the arm 171 and which is urged toward extended position by a spring 175. When the dog 173 is in extended position as illustrated, it is engageable with the teeth of the ratchet wheel 155 and acts to rotate the ratchet wheel a predetermined degree of rotation. In actual practice, this is through an angle of 90 degrees. When the ratchet dog 173 is retracted within the confines of the arm 170, the ratchet wheel 155 will not be engaged and will not rotate. Rotation of the ratchet wheel 155 acts through the shaft 153 to rotate the sprocket wheel 154, thereby moving the film strip 145 a predetermined distance. The arrangement is such that during each operation of the ratchet wheel, the film strip 145 is moved an amount equal to the distance between the pictures on the film strip.

A cam 176 is mounted upon the drive shaft 20 for rotation thereby. A lever arm 177 is pivotally supported at 179 to the housing partition 168 and supports a cam roller 180 which is engageable with the surface of the cam 176. A spring 181 anchored at one end to the lever 177 and anchored at the other end 182 to the partition 168 holds the cam roller 180 against the cam 176. The lever 177 includes a laterally projecting pin 183 which extends through a slot 184 in the partition wall 168 and engages in a notch 185 in the ratchet arm 171 as shown in FIGURE 21.

The cam 176 is properly shaped to swing the arm 177 between two extreme positions, moving the pin 183 between two extreme positions and to rotate the ratchet wheel 155 through a desired angle of rotation.

A means is provided for keeping the ratchet arm from rotating the ratchet wheel to advance the film strip in the absence of a film receiving folder in sealing position. This means comprises a slide 186 which may be noted in FIGURE 2 and which is shown in somewhat enlarged form in FIGURE 14. The slide 186 is moved to the right as viewed in FIGURE 14 as a folder is forced against the end of the slide. The slide is actuated by the portion of the folder which is forced into superimposed relation with the other portion thereof, and accordingly does not interfere with the ejection of the sealed folder.

Movement of the slide 186 acts to pivot the upwardly projecting end of the lever arm 187 which extends through an aperture 189 in the cover plate 190 and through a bracket 191 overlying the plate 190. The manner in which this lever arm functions will be later described. However, for the purpose of this portion of the description it is believed sufficient to indicate that the dog 173 may be held within the confines of the arm 171 to the extent necessary to prevent the dog from engaging the ratchet wheel by a lever arm 193 (FIGURE 13) which is pivotally mounted upon a horizontal shaft 194 supported by suitable bearings on the front wall 11 of the housing and including an angular lip 195 which overlies the edge of the arm 171 and holds the dog from springing outwardly. This lip 195 is shown in FIGURE 22 in released position and is shown in dotted outline in position against the arm to hold the dog from becoming operative.

*Film cutting and transferring mechanism*

A means is provided for receiving the film in its curved state from the film feed mechanism which has been described, cutting the film transparency from the film strip, holding the edges of the film in proper position while swinging the cut film down over the folder in sealing position, and releasing the film in proper location upon the folder. Once in place, the film transparency is held in position by suction until the folder is folded and heat sealed in folded position to enclose the transparency so that it may be viewed through the window.

Figures 13, 14:
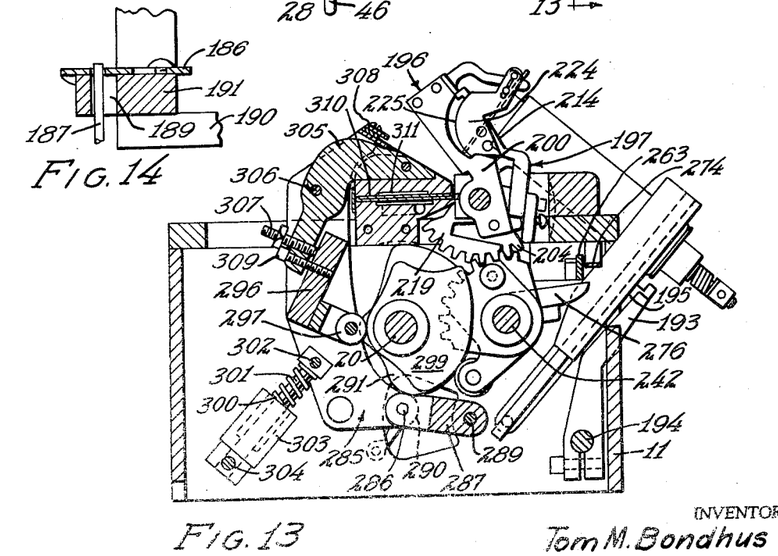
FIGURE 13 is a sectional view through the apparatus, the position of the section being indicated by the line 13—13 of FIGURE 12.
FIGURE 14 is a section detail of a portion of the mechanism.
Figure 23:
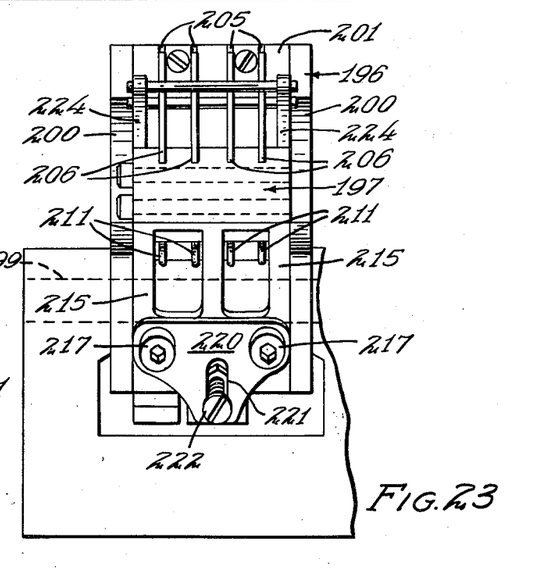
FIGURE 23 is a top plan view of the film shearing and transferring mechanism in lowered position and omitting the remaining structure.

The cutting and transferring mechanism is shown in perspective in FIGURE 2 of the drawings, is shown in elevation in FIGURE 13 of the drawings, is shown in plan in FIGURE 23, and is shown in cross section in FIGURES 15 through 19. The apparatus includes two levers 196 and 197, both of which are rotatably supported for rotation about the axis of a supporting shaft 199. The lever 196 includes a generally rectangular frame having spaced parallel sides 200 which are connected at their outer ends by an outer cross member 201 and which are connected at their opposite ends by a rear cross member 202 which is centrally apertured as indicated at 203. The shaft 199 extends through the aperture 203 and to the cross member 202 on opposite sides of the aperture 203 to pivotally support the lever. A gear segment 204 is shown integral with, or attached to the cross member 202 and forms a means by which the lever arm 196 may be oscillated, as will be later described.

The upper and inner surface of the cross member 201 at the outer end of the lever arm is provided with a series of spaced parallel grooves 205 which accommodate hook shaped levers 206 which are pivoted to the cross member 201 by a transverse pivot 207. These levers 206 are provided with hook shaped ends 209 which are designed to engage one perforated edge of the film transparency 103 while the transparency is engaged therein.

The upper and inner surface of the cross member 202 is provided with a series of spaced slots 210 which are in opposed relation to the slots 205 and which support cam levers 211 which are pivotally connected to the cross member 202 by a transverse pivot 212. The cam levers 211 are provided with hook shaped ends 213 designed to engage the perforated edge of the transparency 103 which is in opposed relation to the edge engaged by the hooks 209, the levers being shaped so as to hold the film transparency in a generally arcuate relation.

Figures 16, 17, 18, 19:
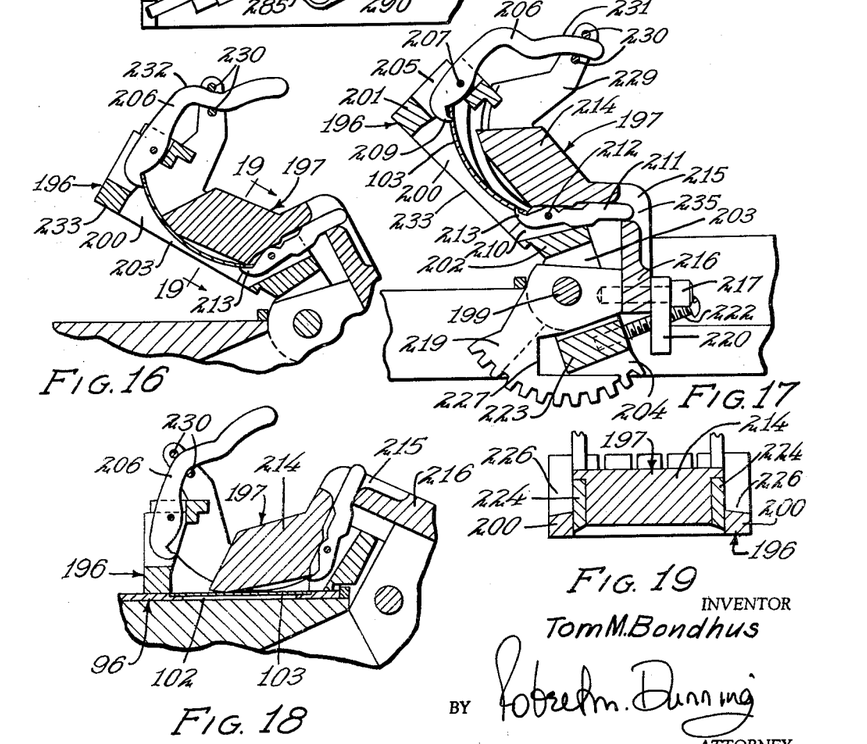
FIGURES 16, 17 and 18 are sectional views through the film transferring and shearing mechanism, showing the parts in different relative positions.
FIGURE 19 is a sectional view substantially on the line 19—19 of FIGURE 16.

The lever 197 includes a solid central portion 214 supported by a pair of spaced curved arms 215 connected at their lower ends by a cross member 216. The cross member 216 is bolted or otherwise secured such as by bolts 217 to a gear segment 219 which is in laterally spaced relation to the gear 204 and which is secured to the shaft 199 for rotation in unison therewith. As indicated in FIGURES 17 and 23 of the drawings, the bolts 217 also serve to attach to the cross member 216 a bracket plate 220 which projects downwardly from the cross member 216 as viewed in FIGURE 17 and is provided with a central slot 221. An adjustment bolt 222 is threaded into the lower portion 223 of the cross member 202, and the head of the adjustment bolt 222 may engage the bracket plate 220 on opposite sides of the slot 221 to limit relative pivotal movement of the two levers.

As indicated in FIGURE 13 of the drawings, cutting plates 224 having arcuate cutting edges 225 are secured to opposite sides of the portion 214 of the lever 197. These cutting blades are shown in closed position in FIGURE 19 of the drawings and cooperate with the inner opposed edges of the sides 200 of the lever 196 to shear the film transparency. The upper edges 226 of the lever sides 200 are also arcuate in shape to accommodate the film strip therebetween when the film strip is in bowed form as described.

As is indicated in FIGURE 17 of the drawings, the gear 219 is notched as indicated at 227 to accommodate the lower portion 223 of the cross member 202 of the lever 196.

Figure 15:
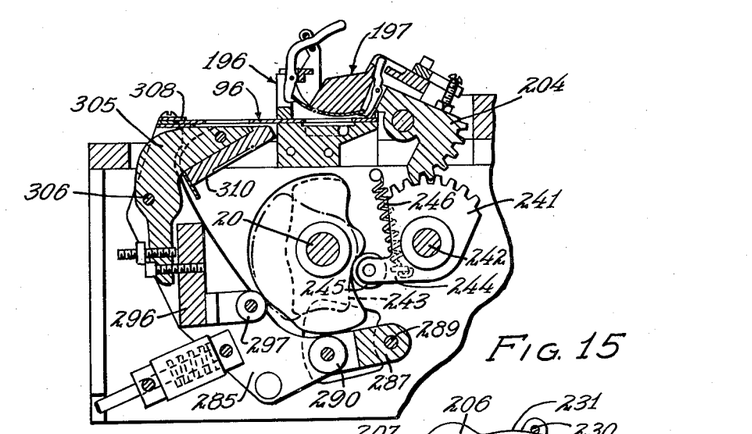
FIGURE 15 is a view similar to FIGURE 13 but showing the parts in a different relative position.

With reference to FIGURE 15, the gear segment 204 which operates the lever, the cutting blades 224 are extended to form upwardly projecting arms 229 which are in parallel relation and which are connected by spaced parallel transversely extending rods 230 between which the cam levers 206 extend. The cam levers 206 include arcuate surfaces 231 which are arcuated about the axis of the shaft 199 so that a certain amount of relative movement may take place between the levers 196 and 197 without materially changing the position of the hooks 209. The levers 206 also include curved surfaces 232 which are engaged by the bars 230 upon further movement of the lever 197 relative to the lever 196. When the flat under surface 233 of the rectangular portion of the lever 196 is swung into horizontal position as indicated in FIGURE 18, the bars 230 operate to swing the hook levers 206 into retracted position to disengage the film transparency 103.

As is also indicated in the drawings, the space between the block portion 214 of the lever 197 and the cross member 216 is slotted as indicated at 235 between the spaced arms 215. The cam ends of the cam levers 211 extend through this slot 235. When the levers 196 and 197 are in certain relative positions as indicated in FIGURES 16 and 17 of the drawings, the hook shaped ends 213 are in engagement with the edge of the film transparency 203. However, as the bottom surface 233 of the lever 196 swings into horizontal position as indicated in FIGURE 18, the relative movement between the two levers acts against the cam ends of the cam levers 211 and pivots these levers into releasing position. Thus as the two lever arms swing down over the film transparency folder, the hooks may release by the remaining angular movement between the two levers.

As is indicated in FIGURE 3 of the drawings, a tubular connection 237 leads from a suction chamber 239 which will be later described to an inlet 240 extending through the heating plate beneath the transparency 103. When the transparency is delivered into the position shown in FIGURE 18, suction holds the transparency in position upon the folder 96 in alignment with the aperture 102 and continues to hold the transparency in place until the folder has been folded and sealed.

To understand the operation of the film cutting and transferring mechanism, it should be understood that both of the levers 196 and 197 are swung upwardly or in a clockwise direction as viewed in FIGURES 15 through 19 until they are substantially in alignment with the film feeding guide. If a film folder 96 is in position to receive a transparency, the lever 197 pivots a slight additional distance, providing an opening between the cutting blades of lever 197 and the cooperable cutting frame of lever 196 to permit the film strip to be fed therebetween. If no film folder is in place to receive the transparency, the lever 197 remains fixed.

After the film strip has been fed between the cutting edges of the levers 196 and 197, the lever 196 is moved toward the lever 197, cutting the film transparency from the strip or film. The two levers then swing downwardly to position the transparency on the folder. If the folder is in place and the transparency is being transported, as the two levers approach their lowermost position, the lever 197 moves slightly relative to the lever 196 pivoting the hook shaped levers 206 and 211 and releasing the transparency. The cycle of operation has been repeated. Upon movement of the lever 197 at the completion of its downward stroke, the latch mechanism is released moving the angular lip 195 to release the ratchet dog 173 and to permit additional film to be fed into cutting position.

As indicated in FIGURE 15 of the drawings, the gear 204 is operated by a gear segment 241 mounted on a counter shaft 242 parallel to the main drive shaft 20. A cam 243 is supported on the drive shaft 20 and rotates in unison therewith. The gear segment 241 is provided with a laterally extending arm 244 which supports a cam roller 245 which is in engagement with the cam 243. The cam 243 thus oscillates the gear segment 241 which in turn imparts the proper movement to the gear segment 204 and accordingly to the lever arm 196. A spring 246 connects the arm 244 to a fixed portion on the housing tending to rotate the gear segment 241 in a clockwise direction as viewed in FIGURE 15. The gear segment 241 is free to rotate about the shaft 242.

Figures 24, 25, 26:
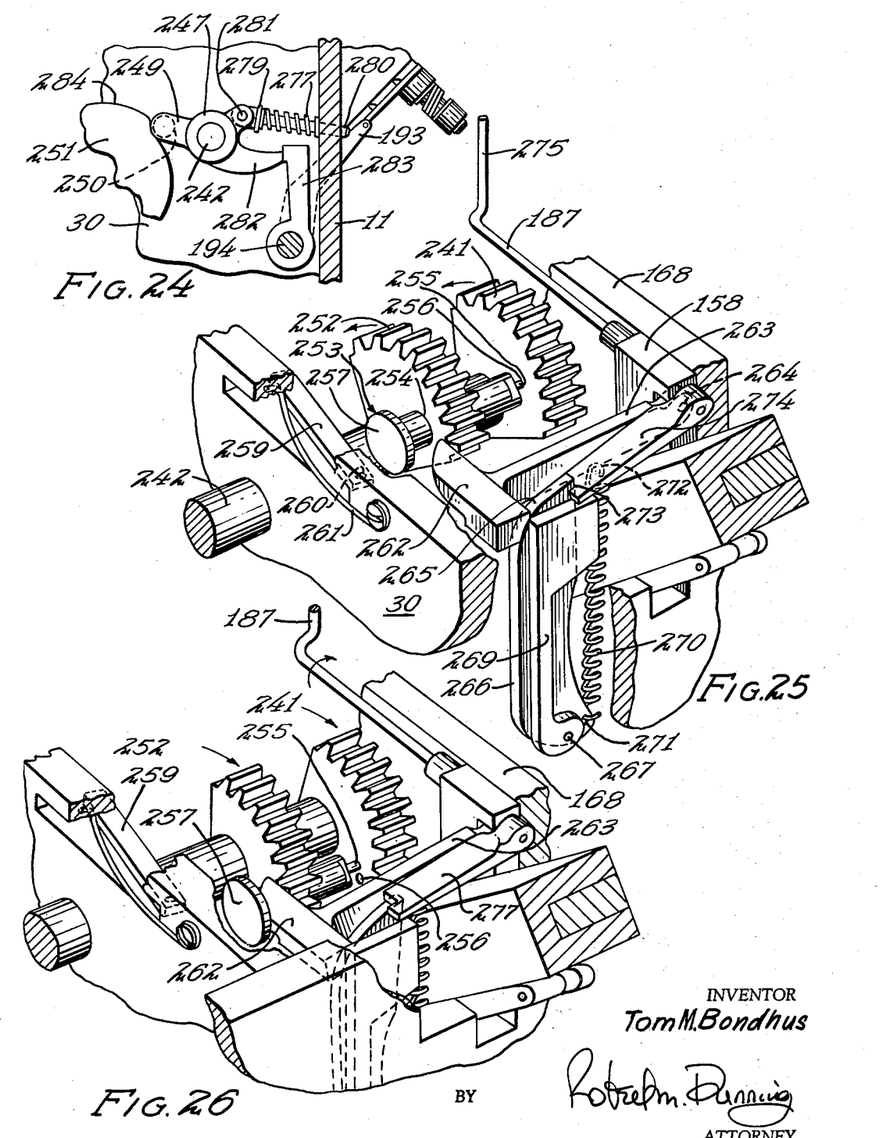
FIGURE 24 is a sectional detail of the apparatus, the position of the section being indicated by the line 24—24 of FIGURE 12.
FIGURE 25 is a diagrammatic perspective view of a portion of the film transferring and shearing drive mechanism, remaining portions being broken away to show the construction thereof.
FIGURE 26 is a view similar to FIGURE 25 showing the parts in a different relative position.

With reference to FIGURE 24 of the drawings, the shaft 242 upon which the gear segment 241 is rotatably supported extends through the partition wall 30. A collar 247 is fixed to the shaft 242 and supports an arm 249 having a bifurcated end to accommodate a cam roller 250. The roller 250 is actuated by a cam 251 mounted upon the main drive shaft 20 for rotation in unison therewith. A second gear segment 252 is secured to the shaft 242 and is designed to mesh with the gear 219 attached to the second lever 197. With reference now to FIGURES 25 and 26 of the drawings, it will be noted that a pin 253 is slidably supported in a transverse aperture 254 in the gear segment 252. The pin 253 is provided with a reduced diameter head end 255 designed to engage in an aperture 256 in the gear segment 241. When the pin 255 is engaged in the socket 256, the two gears are locked from rotation, and the movement of the gear segment 252 is controlled entirely by movement of the gear segment 241. When the gears are locked in this manner, the lever arms 196 and 197 move in unison.

The pin 253 is provided with an enlarged head 257 which is engaged during each cycle of operation by an arm 259 which is pivotally supported at 260 to the partition wall 30 and which is urged into projected position by a spring 261. This arm 259 bears against the pin head 257 and urges the pin toward the gear segment 241 and urges the locking end 255 of the pin into the aperture 256 when the pin and aperture are aligned. Disengagement of the pin from the aperture may be accomplished by the inclined cam 262 mounted on the end of a lever arm 263 which is pivotally supported on pivot arm 264 extending through a bracket 158 in the partition member 168. When the lever arm 263 is in the elevated position shown in FIGURE 25, the cam end 262 is not in the path of movement of the pin head 257. On the other hand, when the lever arm 263 is in the lowered position shown in FIGURE 26, the pin head will be engaged by the slanting cam 262 and retracted from the aperture or socket 256.

The cam end 262 of the lever arm 263 is held in an elevated position by the curved end 265 of an arm 266 which is pivotally supported at 267 to a fixed bracket 269 attached to the frame of the machine and which partially encircles the upper end of the arm 266 to limit its movement in a clockwise direction. The arm 266 is movable from the position illustrated in FIGURE 25 of the drawings to a position slightly to the right of the position illustrated and out of engagement with the cam member 262. A spring 270 is connected at its lower end at 271 to the arm 266 and is connected at its other end as at 272 to the lever 263. When the cam end of the lever arm 263 is elevated, the curved upper end 265 of this lever is moved slightly to the left or in a counter clockwise direction. The upper end of the lever arm 266 is provided with a notch 273 which is engageable with an arm 274 secured to the end of the lever arm 187 which has been previously described. The lever arm 187 is moved in a clockwise position each time the upwardly projecting end 275 of the lever arm 187 is actuated by the slide 186, which in turn is operated by the movement of a folder 96 into sealing position. As a result of this arrangement, as a folder 96 is moved into sealing position, the lever arm 187 is rotated in a clockwise direction, raising the latch lever 274 out of engagement with the notched end 273 of the lever 266. As a result, the weight of the cam end 262 on the lever arm 263 lowers the cam end 262 into the path of movement of the pin head 257. As a result, the pin 253 is released from engagement with the gear segment 241 when, and only when, a folder is in sealing position.

As indicated in FIGURES 12 and 13, the gear segment 241 is provided with a resetting arm 276 which extends axially from the shaft 242 supporting the gear segment 241, and which engages the bottom edge of the lever arm 263 each time the lever 196 swings into its upper extreme position. With reference back to FIGURE 25, it will be noted that each time the lever arm 263 is raised, it exerts a pull upon the spring 270 which swings the arm 266 in a counterclockwise direction. When this action occurs, the latch arm 274 swings back down into engagement with the notched end 273 of the lever arm 266, holding the lever arm 266 in the position illustrated in FIGURE 25 and holding the cam 262 in its elevated position. Thus it will be seen that the locking pin 253 is only disengaged from the gear segment 241 when a folder is in sealing position and the gear segments 241 and 252 remain locked in engagement until the latch arm 274 is again released.

When the gear segment 252 operates in unison with the gear segment 241, the cam roller 250 (FIGURE 24) does not engage the cam 251. However, when the pin 253 is released, and the shaft 242 moves in a clockwise direction, the sleeve 247 is rotated in a counter clockwise direction by a spring 277 which is interposed between a shoulder 279 on a pivotal and slidable shaft 280 and the front wall 11 of the housing. The lever 280 is pivotally connected to the collar 247 at 281. When the cam roller 250 engages the cam 251, an arm 282 on the sleeve 247 engages an arm 283 on a shaft 194 extending through the partition 30 and supported thereby, moving the rocker arm 283 in a clockwise direction. As was previously described in conjunction with FIGURE 13, the shaft 194 supports the lever arm 193 which permits the ratchet dog 173 to move the film into registry with the film cutting and transferring mechanism.

Thus it will be seen that the movement of a folder 96 into sealing position rocks the lever 187 which disengages the latch 274 from the notched end 273 of the arm 266, allowing the cam end 262 of the lever arm 263 to move into the path of the head 257 of the pin 253 and thereby to withdraw this pin from engagement with the gear segment 241.

Due to the fact that the levers 196 and 197 can rotate relative to one another only through a limited angular distance, the two levers swing upwardly and downwardly in unison even if the pin 253 is retracted. However, when the pin is retracted, the gear segment 252 rotates through a greater angular distance than the gear segment 241 due to the action of the spring 277. In other words, the gear segment 252 is free to rotate to a limited degree relative to the gear segment 241, the spring 277 acts to urge the cam roller 250 against the cam 251 in one extreme position of the two gears, and acts to swing the lever 197 out of engagement with the lever 196, as illustrated in FIGURE 17 of the drawings so as to provide a gap between the levers to receive the film strip in the other extreme position. This is due to the fact that the arm 280 which supports the spring 277 passes through dead center with respect to the shaft 242 and tends to urge the collar 247 and the shaft 242 either in one direction or the other. When the two gear segments 241 and 252 are connected by the pin 253, the cam roller 250 does not engage the cam 251.

When the gear segment 252 is not latched to the gear segment 241, and the roller 250 engages the cam 251, the arm 282 on the collar engages the arm 283 and swings the pawl releasing arm 193 into released position to permit the film advancing means to advance the film into the cutter. Rotation of the cam 251 in a clockwise direction as viewed in 24, causes the larger diameter portion 284 of this cam to rotate the shaft 242 in a clockwise direction, thus rocking the gear segment 252 in a clockwise direction until the end 255 of the pin 253 engages in the socket 256 in the gear segment 241. The two gears are then locked together, and remain locked together until the insertion of the next film folder 96 again rocks the lever 187, dropping the cam end 262 of the lever 263 in the path of movement of the pin 253 which again permits independent rotation of the gear segment 241.

As will be understood, the pin 253 will only become engaged in the socket 256 when the head 257 is in contact with the spring urged arm 259 so that at all other angular positions of the two gears, they may move independently when unlocked.

*Film folding and sealing means*

As described in connection with FIGURES 1 and 9 the table of the apparatus includes an L-shaped heating plate 130 which is heated by a detaching heating element 131 or other suitable means. The apparatus for folding the folder and for applying sealing pressure thereto is perhaps best illustrated in FIGURES 13 and 15 of the drawings. This mechanism is shown in sealing position in FIGURE 13 and is shown in retracted position in FIGURE 15 of the drawings.

The apparatus includes what can be described as a floating lever 285 which is pivotally attached at 286 to a link 287 pivotally supported at 289 to the frame of the apparatus. A cam roller 290 is mounted upon the pivot 286 and is engageable with a cam 291 on the drive shaft 20. As may be noted in FIGURE 20 in the drawings, the link 287 is provided with an arm 292 which extends through an aperture 293 in the partition wall 168 for attachment with a spring 294 which is anchored to the frame at 295. The spring 294 acts to hold the cam roller 290 against its cam 291.

The lever 285 supports a bracket 296 which pivotally supports a cam roller 297 which engages a cam 299 also on the drive shaft 20. The cam roller 297 is urged against the cam 299 by means of a spring 300 supported by a slide 301 pivotally attached to the lever 285 at 302 and which slides in a bearing 303 pivotally connected to the frame of the apparatus at 304.

The arm 285 supports a pressure head 305 by means of a pivot 306, the head being angularly adjustable relative to the lever 285 by adjustment bolts 307 and 309 engaging the bracket 296. In actual construction, the bracket 296 comprises a cross member connecting two spaced lever arms between which the pressure head 305 is supported. The pressure head 305 is provided with a flat under surface 310 having an axial recess 311, the flat surface 310 being as similar in shape to the shape of the folder 96 in folded position. The top of the head 305 is provided with an inwardly projecting guide flange 308 which is designed to guide an edge of the folder into position.

The cams 291 and 299 combine to move the pressure head 305 from retracted position shown in FIGURE 15 to the clamping position shown in FIGURE 13. In accomplishing this operation, the cams act to raise the head 305 in a substantially vertical direction from the position shown in FIGURE 15 while the film transferring and cutting levers 196 and 197 are in lowered position upon one-half of the film folder, causing the film to spring out from beneath the guide flange 311 and to fold into generally vertical position. The head 305 then moves laterally to the right as viewed in FIGURES 13 and 15, folding the folder toward closed position, this action taking place as the combined levers 196 and 197 swing from the position shown in FIGURE 15 toward the position shown in FIGURE 17. The head 305 swings laterally until it is in a position directly over the folded folder and at this point the head moves downwardly to apply a compressive force upon the folder.

As was described, the folder is preheated before being pushed into sealing position, and one side of the folder continues to be heated by the heating plate as long as the folder rests thereupon. As a result, the thermoplastic adhesive which is on the folder causes the marginal edges of the folder to be rigidly sealed together.

After the sealing operation, the pressure head 305 is operated by cams to move vertically out of contact with the folder and then to swing laterally and then downwardly into the retracted position shown in FIGURE 15. As soon as the pressure head 305 starts its upward movement, the ejecting blade 122 moves beneath the pressure head and acts to eject the sealed folder from its place. Immediately thereafter, the arms 124 engage another folder which has been in preheating position and urges it into sealing position in the manner which has been described.

*Scrap ejecting device*

A means is provided for ejecting scrap film from the film strip when the picture is misframed or blank. This is accomplished by means of a suction manifold, a portion of which is illustrated in FIGURES 1 and 2 of the drawings and which is indicated in general by the numeral 313. The manifold 313 is a curved structure which forms a tubular body having an open end 314 adjacent the cutting and transferring mechanism, and into which the end of the film strip extends when the transparency moves into the cutting mechanism. The conduit is provided with a transparent window 350 at its forward end through which the scrap being ejected may be noted.

With reference to FIGURE 29 of the drawings, it will be noted that a suction chamber 316 is provided with an opening 317 near its lower end communicating with a tubular connector 319 which is secured to a source of partial vacuum, not illustrated in the drawings. The vacuum chamber 316 is provided with an opening 320 at its upper end which communicates with the fitting forming the suction chamber 239 which is connected to the vacuum tube 237. The vacuum chamber 316 is also connected by an opening 321 to a second vertical rectangular chamber 322 having an open upper end 323 which is normally closed by the manifold 313. A butterfly valve 324 is pivotally mounted upon a transverse shaft 325, and extends diagonally across the lower end of the chamber 232 and is swingable into open position so that the lower end of the chamber 232 may communicate with a collecting trough 326. A butterfly valve 327 also extends diagonally across the chamber 316 and may function to close the suction connection with the tubular conduit 237 which leads to the opening 240 beneath the film transparency.

The valve 327 is pivotally supported upon the shaft 329. Operating arms 330 and 331 are mounted upon the shafts 325 and 329 to rotate in unison therewith. An arm 332 is pivotally connected to the arm 330 at 333, and is pivotally connected to the arm 331 at 334. The arm 332 is connected to a link 335 which supports a cam roller 336 which is engageable with a cam 337 mounted upon the drive shaft 20. Rotation of the drive shaft 20 causes the arm 332 to be moved in a generally lateral direction thus opening the valves 324 and 327.

The connection 319 is connected to a source of partial vacuum, and when the two valves are in the closed position illustrated in the drawings, suction is provided to draw the scrap film which has been cut from the film strip through the suction manifold 313 and into the chamber 322. The scrap film is deposited in the chamber 322 above the valve 324. When the cam 337 operates against the cam roller 336 to open the valves 324 and 327, the scrap film which has been deposited in the chamber 322 drops into the trough 326. At the same time, suction is transmitted to the conduit 237 in order to hold the film transparency in place within the folder. Obviously, this operation takes place during the folder sealing operation.

Thus it will be seen that through the use of the apparatus, the film strip is automatically fed into position, is cut off, and the waste stock is disposed of. The operator may at all times view the operation of the apparatus and may stop the operation at any time by disengaging the clutch. The folders in which the transparencies are to be mounted are fed one at a time from the bottom of the hopper, are preheated on the heating plate, and then are transferred to sealing position where the transparency is placed upon the folder in proper relation relative to the window. The transparency is held in place by suction.

As soon as the transparency has been deposited in proper position, the folder is folded and heat seals together. After the sealing operation, the seal folder is ejected from the apparatus, and the cycle of operation starts.

In the event a folder does not move into proper position for sealing, the film feed mechanism ceases to operate and the cutter does not open to receive the film. However, as soon as the folder is in proper position, the structure continues to operate in the proper manner.

In accordance with the patent statutes, I have described the principles of construction and operation of my improvement in automatic film mounting apparatus, and while I have endeavored to set forth the best embodiment thereof, I desire to have it understood that changes may be made within the scope of the following claims without departing from the spirit of my invention.

I claim:

1. An apparatus for placing a section of an elongated film strip having spaced apertures along one edge upon a film mount including means engaging the film apertures and operable to advance the film longitudinally, a pair of pivotally supported cutting jaws on opposite sides of the path of movement of the film, gripping means on one of said jaws on opposite sides of said film engageable with the longitudinal edges of said film to hold the film therebetween, means for relatively pivoting said jaws to cut a section from the film strip, a film mount support in the path of pivotal movement of said jaws, means pivoting said jaws toward and away from a film mount on said support, and means for releasing said means engageable with the longitudinal edges of said film when said jaws are pivoted adjacent to said film mount.

2. An apparatus for positioning a section of an elongated film strip having spaced sprocket apertures along one edge thereof upon an apertured film mount including sprocket means engageable in said sprocket apertures to move said film strip longitudinally, film guide means holding said film strip curved in cross section, a pair of pivotally supported cutting jaws positioned in one pivotal position thereof on opposite sides of the path of movement of the film leaving said film guide means, film gripping means pivotally supported by one of said jaws engaging opposite longitudinal edges of said film strip and holding the engaged portion curved in cross section, means relatively pivoting said jaws to cut a section from said film strip, a film mount support in the path of pivotal movement of said jaws, means pivoting said jaws in unison to bring said one jaw into engagement with said film mount, and means on the other of said jaws engageable with said film gripping means for pivoting the same out of film engaging position upon further pivotal movement of said other jaw toward said film mount after said one jaw is in engagement with said film mount.

3. The structure of claim 2 and in which said other jaw presses said film section against said film mount upon release of said film gripping means.

4. The structure of claim 2 and including a source of partial vacuum connected to said film mount support to draw said film section against said film mount.

5. An apparatus for positioning a section of a film strip on a film mount having a pair of similar hingedly connected panels having registrable apertures, and heat sensitive adhesive on one of said panels, the apparatus including a film guide holding said film strip curved in cross section, a pair of cutting jaws pivotally supported on an axis parallel to the direction of movement of the film strip, one said jaw including a hollow generally rectangular head having parallel cutting edges extending transversely of the direction of travel of said film strip and the other jaw having a head swingable between said cutting edges and having cooperable cutting edges, said jaws, in one pivotal position, being on opposite sides of the path of movement of said film strip passing through said film guide, film edge gripping means pivotally supported on said one jaw, means on said other jaw engageable with said film edge engaging means and operable, upon predetermined relative pivotal movement between said jaws to pivot said film edge gripping position, a film mount support adapted to support a film mount in the path of movement of said jaws, and means connected to said jaws to pivot said jaws together to cut a section of a film strip between said jaws, to swing said jaws in unison until said one jaw engages against a film mount on said support, to move said other jaw against the film section supported by said one jaw and simultaneously releasing said film edge gripping means to press said film section against one panel of said film mount, and to pivot said jaws back to opposite sides of the path of movement of the film strip.

6. The structure of claim 5 and including a source of supply of partial vacuum connected to said film mount support to draw said film section against said film mount.

7. The structure of claim 5 and including folding means engageable with the other panel of said film mount while said jaws are in engagement with said film mount and means driving said folding means to fold said other panel toward said one panel.

8. The structure of claim 7 and in which said driving means for said folding means completes the folding of said other panel after said jaws are pivoted out of engagement with said one panel.

9. The structure of claim 7 and including means for heat sealing the said panels in face contact with the film section therebetween.

10. The structure of claim 7 and including heating means for heating the adhesive on said mount to a tacky condition prior to placing the film section thereupon.

11. A transparency mounting apparatus for use in mounting a section of an elongated film strip in a film mount, comprising a pair of hingedly connected similar apertured panel at least one of which includes a film of heat sensitive adhesive, the apparatus including a hopper for supporting a series of mounts in superposed relation, a table adjoining said hopper and over which said film mounts may be moved, means engageable with the lowermost film mount in said hopper to move the same to a predetermined position on said table, a heating plate at said predetermined position for heating said film to a plastic state, means for moving said heated film mount from said first position to a second predetermined position on said table, means for transferring a film section onto one panel of said film mount and holding said panel against said table, folding means engageable with the other said panel to fold said other panel while said one panel is held, means releasing said transferring means from said one panel while continuing the folding of said other panel, said folding means clamping said panels together at the completion of said folding operation.

12. The structure of claim 11 and including means for returning said folding means to its original position, and means for ejecting the closed film mount from said second predetermined position.

13. The structure of claim 11 and in which said folding means is below the surface of said table in its original position to underlie said other panel in said second predetermined position.

14. The structure of claim 11 and including means for moving said folding means upwardly to hinge said other panel upwardly, laterally over said one panel to hinge said other panel toward said one panel, and downwardly to clamp said panels against said table.

15. The structure of claim 5 and including suction means for removing scrap portions of film from said film strip after said cutting operation.

References Cited by the Examiner
UNITED STATES PATENTS

| | | | |
|---|---|---|---|
| 2,555,218 | 5/51 | Bailey | 156—108 |
| 2,717,710 | 9/55 | Baker | 156—108 |
| 2,725,155 | 11/55 | Fitch | 156—355 |
| 2,839,211 | 6/58 | Fairbanks | 156—572 X |
| 2,865,425 | 12/58 | Byers | 156—386 |
| 2,889,066 | 6/59 | Alberty | 156—521 |
| 3,067,805 | 12/62 | Flynn | 156—108 |

EARL M. BERGERT, *Primary Examiner.*

DOUGLAS J. DRUMMOND, CARL F. KRAFFT,
*Examiners.*